Oct. 15, 1968 W. M. McCAMPBELL ET AL 3,406,336
RC RATE GENERATOR FOR SLOW SPEED MEASUREMENT
Filed June 22, 1966
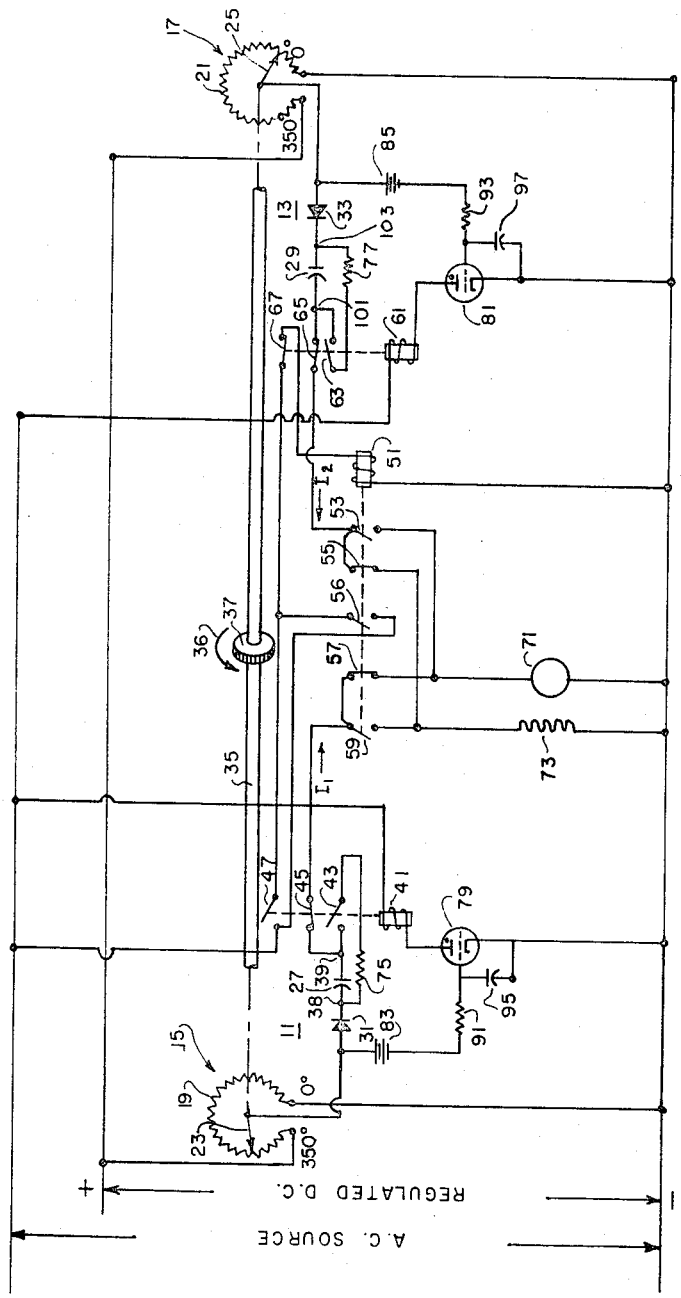
WILLIAM M. McCAMPBELL
CLAYTON LOYD
INVENTORS
BY
ATTORNEYS

United States Patent Office 3,406,336
Patented Oct. 15, 1968

3,406,336
RC RATE GENERATOR FOR SLOW SPEED MEASUREMENT
William M. McCampbell and Clayton Loyd, Madison, Ala., assignors to the United States of America as represented by the Administrator of the National Aeronautics and Space Administration
Continuation-in-part of application Ser. No. 516,795, Dec. 27, 1965. This application June 22, 1966, Ser. No. 560,968
4 Claims. (Cl. 324—70)

ABSTRACT OF THE DISCLOSURE

A slow speed measuring system including first and second RC rate generators, each consisting of a continuous rotation potentiometer having their respective resistors connected across a DC source and their wiper arms coupled to capacitors. The wiper arms are driven in accordance with the speed to be measured and are angularly displaced from one another. Switching means responsive to the position of the wiper arms are provided for alternately coupling the outputs of the RC rate generators to current indicating means so as to maintain the current indicating means connected to the RC rate generator operating in its continuous interval. Additional switching means are provided to discharge the respective capacitors after disconnection with the current indicating means and to connect the output of the RC rate generator not connected to the current indicating means to current conducting means.

---

The invention described herein may be manufactured and used or for the Government of the United States of America for governmental purposes without the payment of any royalties thereon or therefor.

This application is a continuation-in-part of application Ser. No. 516,795 filed Dec. 27, 1965, now abandoned.

This invention relates to a continuous speed measurement apparatus and more particularly to an apparatus utilizing RC rate generators for continuous measurement of slow speeds. Though the invention is not limited thereto such a speed measurement apparatus is particularly adapted for use in a welding system for providing continuous measurement of weld wire feed rates which may be of the order of five inches per minute so as to either provide a record for quality control purposes or to provide a control signal indicative of the actual feeding rate.

In such welding systems it has been the general practice in the past to employ DC tachometers to translate the travel speed of the weld wire into an electrical output. However, DC tachometers, which are essentially small permanent magnet or separately excited generators that produce an electrical output proportional to the rotational speed of the generator, have not proven entirely satisfactory under all conditions for the reason that because they have a non-linear output at slow speeds it has been necessary to drive the DC tachometer with a gear having a step-up ratio. The use of such a gear driven by either the weld wire or the weld wire feed motor allows the DC tachometer to be driven at a higher speed so as to operate on its linear portion but it is also inherently accompanied by an increase in the torque requirements necessary to drive the tachometer and as the torque necessary to drive the tachometer is already high due to brush friction and hysteresis effects, this increase can have the undesirable effect of either retarding the feeding of the weld wire or causing slipping to occur between the weld wire and the tachometer.

The difficulties encountered in operating a DC tachometer on its linear portion without introducing excessive torque requirements on the system has resulted in an investigation being made into the possibilities of obtaining a low torque and low speed device for providing accurate measurement of slow travel speeds and which may be driven directly by the object whose speed is being observed.

Accordingly it is an object of this invention to provide an accurate device for continuous slow speed measurement.

Another object of this invention is to provide a low torque device for slow speed measurement.

Other and further objects, uses, and advantages of the present invention will become apparent as the description proceeds.

In accordance with this invention a signal is obtained which is directly proportional to the speed of the object being observed by use of an RC rate generator which consists of a continuous rotation potentiometer having a linear varying resistor and a wiper arm and a capacitor connected to the wiper arm. In operation the ends of the linear varying resistor are connected across a source of regulated DC voltage and the wiper arm is driven by the object whose speed is being observed, such as the weld wire, in such a manner that an increasingly greater voltage is applied to the capacitor. This increasing voltage will cause a capacitor charging current that has an average value that is directly proportional to the velocity of the object being observed and this relationship will exist for all positions of the wiper arm except when the wiper arm has rotated to a position between the ends of the resistor. During this position, hereinafter referred to as the portion of discontinuity, the wiper arm is not connected to the resistor and no charging current will be generated.

To overcome the problem caused by the portion of discontinuity and provide a continuous indication of speed the present invention provides a second RC rate generator having substantially the same charge rate as the first RC rate generator. The wiper arm of the second RC rate generator is also driven by the object whose speed is being observed however the wiper arm is angularly displaced from the wiper arm of the first RC rate generator by an angle greater than the portion of discontinuity so that both wiper arms are never travelling in the portion of discontinuity at the same time. The outputs of these generators are then alternately connected to current indicating means by providing a control circuit designed to transfer the current indicating means from one RC rate generator to the other in such a manner that the RC rate generator feeding the current indicating means is always operating on the continuous portion of the potentiometer.

This will be more readily understood by the following detailed description when taken together with the accompanying drawing in which the sole figure is a schematic diagram of a speed measuring apparatus incorporating the present invention.

Referring now to the drawing there is shown a circuit diagram of a RC rate generator system for slow speed measurement incorporating the present invention. The system includes a first and a second RC rate generators generally shown at 11 and 13, consisting of continuous rotation potentiometers 15 and 17 having substantially equal linear varying resistors 19 and 21 connected across a regulated DC source and having wiper arms 23 and 25 connected to substantially equal capacitors 27 and 29 through diodes 31 and 33. While the potentiometers are designed for continuous rotation they are of necessity discontinuous for a small part of the cycle so that the ends of the linear varying resistors 19 and 21 are electrically separated. For example in the embodiment as shown the wiper arms 23 and 25 will be electrically connected to the resistors 19 and 21 for 350 degrees of the cycle and accordingly the portion of discontinuity will be 10 degrees. The wiper arms 23 and 25 are mechanically coupled together by shaft 35 which is adapted to be driven by gear 37 and the wiper arms are angularly displaced from one another by an angle greater than the portion of discontinuity so that at the time shown and with the direction of rotation of gear 37 shown by arrow 36 wiper arm 23 is approaching the 350 degree end of resistor 19 and wiper arm 25 is rotating away from zero degree end of resistor 21.

Associated with RC rate generator 11 are a plurality of switches 43, 45, and 47 that are controlled by solenoid 41 and associated with RC rate generator 13 are a plurality of switches 63, 65 and 67 that are controlled by solenoid 61. With solenoids 41 and 61 de-energized the respective switches assume of the positions as shown so that junction 39 is connected through closed switch 45 to switches 57 and 59 and junction 101 is connected through closed switch 65 to switches 53 and 55. Switches 53, 55, 56, 57 and 59 are controlled by solenoid 51 and with solenoid 51 de-energized assume the positions as shown so that switch 45 is connected to the current indicating means 71 through closed switch 57 and switch 65 is connected to resistor 73 through closed switch 55. Energization of solenoid 51 reverses the positions of switches 53, 55, 56, 57 and 59 so as to connect switch 45 to resistor 73 through switch 59 and to connect switch 65 to the current indicating means 71 through switch 53. Resistor 73 is a matching resistor and has substantially the same resistance as the internal resistance of current indicating means 71. Solenoid 51 is connected across an AC source through switch 67 controlled by solenoid 61 and through switch 47 controlled by solenoid 41 with locking switch 56 connected in parallel with switch 47 and controlled by solenoid 51.

Each RC rate generator also includes a capacitor discharging circuit. As seen in the drawing associated with RC rate generator 11 is the series combination of switch 43 and resistor 75 that are connected across capacitor 27 to junctions 38 and 39 and associated with RC rate generator 13 is the series combination of switch 65 and resistor 77 that are connected across capacitor 29 to junctions 101 and 103.

Solenoids 41 and 61 which control the position of switches 43, 45 and 47 and 63, 65 and 67 respectively are connected across the AC source through the respective plate to cathode circuits of thyratrons 79 and 81. These thyratrons are normally rendered non-conductive by the inclusion of a constant voltage source such as batteries 83 and 85 in the respective grid circuit of the thyratrons. As shown wiper arm 23 is connected to the grid of thyratron 79 through battery 83 and resistor 91 and wiper arm 25 is connected to the grid of thyratron 81 through battery 85 and resistor 93. Capacitors 95 and 97 couple the grid to the cathode of the respective thyratrons.

The operation of the present invention may best be understood by first referring to the operation of RC rate generator 11. As shown in the drawing, wiper arm 23 is driven by shaft 35 and at the time shown in the drawing with a rotation of gear 37 as shown by arrow 36 wiper arm 23 is approaching the 350 degree end of resistor 19. Switches 45 and 57 are both in closed position so as to connect the output of the RC rate generator 11 at junction 39 to current indicating means 71. Since resistor 19 is connected across the regulated DC source and wiper arm 23 is moving in a counter clockwise direction an increasingly greater voltage is applied to capacitor 27 which will cause a capacitor charging current $I_1$ in the direction as indicated on the drawing to flow through current indicating means 71.

If the product of $R \cdot C$ is small (wherein R equals the internal resistance of the current indicating means and C equals the capacitance of capacitor 27) the charging current $I_1$ will be directly proportional to the rotational speed of shaft 35. A change in the speed of shaft 35 and thereby a change in the difference of voltage applied to the capacitor 27 with respect to time, will decrease or increase the charging current $I_1$ depending on whether the speed is faster or slower; however, $I_1$ will remain directly proportional to the shaft 35 rotational speed as long as wiper arm 19 remains on the continuous part of resistor 23. When wiper arm 23 rotates past the 350 degree end of resistor 19 no charging current will be generated as wiper arm 19 will now be disconnected from the DC source. In the example shown, that is a 10 degree period of discontinuity of resistor 19, there would be no current generated for a period of 1.8 seconds if wiper arm 19 were rotating at one r.p.m.

The present invention overcomes the problem caused by the discontinuity by providing a second RC rate generator 13 having substantially the same charge rate as the first RC rate generator 11 in which the wiper arm of the second RC rate generator is angularly displaced from the wiper arm of the first generator by an angle greater than the period of discontinuity so that both wiper arms will never be in the period of discontinuity at the same time. The operation of the second RC rate generator 13 is similar to that of RC rate generator 11 and as disclosed in the drawing wiper arm 25 is angularly displaced from the wiper arm 23 by an angle greater than the portion of discontinuity. As shown wiper arm 25 is driven by shaft 35 in a counter clockwise direction so that an increasing greater voltage is applied to capacitor 29 and the output of RC rate generator 15 at junction 101 is connected through closed switches 65 and 55 to resistor 73. Since both wiper arms 19 and 25 are driven at the same rotational speed, capacitor 29 charging current $I_2$ in the direction as indicated in the drawing, will be equal to $I_1$ if resistor 73 equals the internal resistance of current indicating means 71 as the change in voltage applied to capacitors 27 and 29 with respect to time will be equal in both RC rate generators.

The switching of the current indicating means from the output of one RC rate generator to the output of the other RC rate generator so as to obtain a continuous indication of speed is accomplished in the following manner. As wiper arm 23 approaches the 350 degree end of resistor 19 a point will be reached where the back bias caused by battery 83 is overcome and thyratron 79 will fire so as to energize solenoid 41. Switch 45 previously closed will open to disconnect junction 39 of RC rate generator 11 from current indicating means 71 and switch 47 previously open will close, thereby connecting solenoid 51 across the AC source through the already closed switch 67. With solenoid 51 energized switch 55 will open and switch 53 will close so that junction 101 of RC rate generator 11 is disconnected from resistor 73 and simultaneously connected to current indicating means 71. The current indicating means 71 will thereby carry $I_2$ which was already equal to $I_1$ (assuming no change in rotation speed of shaft 35) as long as solenoid 51 remains energized. Additionally switch 43 also controlled by solenoid 41 will close upon the energization of solenoid 41 to discharge capacitor 27 through resistor 75 thereby resetting RC rate generator 11.

When wiper arm 23 goes past the 350 degree end of resistor 19 into the period of discontinuity thyratron 79 will again become non-conductive due to the back bias voltage applied by battery 83 and solenoid 41 will be deenergized thereby returning switch 47 to its open position, switch 45 to its closed position and switch 43 to its open position. To insure that the opening of switch 47 does not de-energize solenoid 51 prematurely, locking switch 56 controlled by solenoid 51 is provided in parallel circuit relationship with switch 47. Switch 56 originally open was closed upon the initial energization of solenoid 51 thereby maintaining a current path for solenoid 51 even though switch 47 is returned to its open position by the de-energization of solenoid 41.

The continued energization of solenoid 51 also provides a reversal of the positions of switches 59 and 57 as shown on the drawing so that switch 59 is now closed and switch 57 is now open thereby connecting the output of RC rate generator 11 at junction 39 to matching resistor 73 through closed switch 45. As the wiper arm 23 continues its rotation and goes past the period of discontinuity and into the period of continuity of resistor 19 a capacitor 27 charging current $I_1$ will again be generated and as previously explained this charging current will be equal to the current charging capacitor 29 since the change in voltage with respect to time applied to capacitors 27 and 29 will be equal.

In the embodiment as shown the switching of the current indicating means back to the output of the first RC rate generator 11 is accomplished by essentially the same way in which the original switching occurred. That is as wiper arm 25 rotates toward the 350 degree end of resistor 21 a point is reached when the back bias on thyratron 81 is overcome and the thyratron will conduct to energize solenoid 61. This condition reverses the position of switch 65 to disconnect RC rate generator 13 from the current indicating means and also opens switch 67 to overcome the locking action of switch 56 so as to de-energize solenoid 51. Switches 59 and 57 which were held respectively closed and open by the energized solenoid 51 will now reverse their position so that to output of RC rate generator 11 at junction 39 will again be connected to current indicating means 71. Switch 63 closed by energization of solenoid 61 will provide a discharge path for capacitor 29 so that RC rate generator 13 is effectively reset.

When the wiper arm 25 reaches the period of discontinuity of resistor 21 thyratron 81 will again become nonconductive and solenoid 61 will be de-energized thereby returning switch 63 to its open position, switch 65 to its closed position and switch 67 to its closed position. The closing of switch 67 at this time will not however energize solenoid 51 because locking switch 56 was opened by the initial de-energization of solenoid 51. In this manner the output of the RC rate generator 13 at junction 101 is again connected to matching resistor 73 through closed switch 55 and when wiper arm 25 reaches the portion of continuity of resistor 21 a capacitor 29 charging current $I_2$ will again be generated. The cycle continues in this manner with first one of the RC rate generators feeding the current indicating means and then the other, thereby overcoming the problem caused by the period of discontinuity on resistors 19 and 21. Continuous operation of the system is insured by provision of the capacitor discharge circuits which assure that capacitors 27 and 29 are receptive to a charging current when the respective wiper arms return to the portion of continuity of the resistors.

From the foregoing it is seen that a speed measuring system utilizing RC rate generators has been disclosed that provides continuous indication or measurement of slow speeds. Also it is seen that the transfer from one RC rate generator to the other is accomplished without the effect of stealing current from the RC rate generator as the present invention uses the voltage (increasing with the advancing position of the wiper arms on the potentiometer) to produce the necessary bias to fire the solenoid actuating thyratron. Additionally it is apparent that the system has low torque requirements so that it can be driven by means of a wheel in contact with the object whose speed is being observed to measure actual speed.

Although the embodiment of the present invention has been described utilizing a thyratron switching circuit it is believed evident to those skilled in the art that various other means could be employed without departing from the invention. For example these means could include any of several semiconductor devices or electron tube circuits responsive to the angular position of the respective wipers. Also the current indicating means could take several different forms in the practice of this invention. For example if a record is desired for quality control purposes a recorder could be utilized.

Obviously, many other modifications and variations of the present invention are possible in light of the above teachings. Therefore, this invention is to be considered as limited only in accordance with the teachings thereof as set forth in the claims appended hereto.

What is claimed is:
1. A speed measuring apparatus comprising:
 (a) a first and a second continuous rotation potentiometer each having a resistor having first and second ends and each having a wiper arm engageable with said resistors;
 (b) a source of direct current having positive and negative output terminals respectively connected to said first and second ends of said resistors;
 (c) means for moving each of said wiper arms along its resistor from said second end to said first end and then out of engagement therewith to the second end again at a rate proportional to the speed to be measured, said wiper arms being connected for movement out of phase with each other;
 (d) first and second capacitors respectively coupled to said wiper arms of said first and second potentiometers;
 (e) current indicating means having a first end and a second end, said first end connected to said second ends of said resistors;
 (f) current conducting means having a first end and a second end, said first end connected to said second ends of said resistors;
 (g) switching means for alternately coupling said capacitors to said second ends of said current indicating means and said current conducting means;
 (h) means actuating said switching means to break the connection between the current indicating means and each capacitor before the wiper arm controlling the circuit thereof moves out of engagement with its resistor, to complete a connection to the other capacitor in which the wiper arm controlling the circuit thereof has moved into engagement with its resistor and to connect the current conducting means to said capacitor disconnected from said current indicating means after the wiper arm controlling the circuit thereof has moved into engagement with its resistor; and
 (i) means for discharging said capacitors after disconnection from said current indicating means and before connection with said current conducting means.
2. The system of claim 1 in which:
 (a) said actuating means includes a first position responsive device coupled to said wiper arm of said first potentiometer for producing a first control signal when said wiper arm is within a predetermined proximity with said first end of its resistor and for producing a second control signal when said wiper arm is out of engagement with its resistor and a second position responsive device coupled to said wiper arm of said second RC rate generator for producing a third control signal when said wiper arm is within a predetermined proximity with said first end of its resistor and for producing a fourth control signal when said wiper arm is out of engagement with its resistor; and
 (b) said switching means includes a first plurality of switches responsive to said first control signal for providing an open circuit between said first capacitor and said current indicating means and a closed circuit between said second capacitor and said current indicating means and responsive to said second control signal for providing a closed circuit between said first capacitor and said current conducting means, and a second plurality of switches responsive to said third control signal for providing an open circuit between said second capacitor and said current indicating means and a closed circuit between said first capacitor and said current indicating means and responsive to said fourth control signal for providing a closed circuit between said second capacitor and said current conducting means.

3. The system of claim 2 in which:
(a) said capacitor discharge means includes a first and a second series circuit respectively connected across said first and second capacitors, a resistor and a switch in each of said circuits; and
(b) means responsive to said first control signal for actuating said switch of said first circuit to provide a discharge path for said first capacitor and means responsive to said third control signal for actuating said switch of said second circuit to provide a discharge path for said second capacitor.

4. The system of claim 2 in which:
(a) said first position responsive device includes a first voltage responsive device coupled to said wiper arm of said first potentiometer for sensing the voltage applied to said wiper arm; and
(b) said second position responsive device includes a second voltage responsive device coupled to said wiper arm of said second potentiometer for sensing the voltage applied to said wiper arm.

References Cited

UNITED STATES PATENTS 2,575,494  11/1951  Hornfeck _____ 324—70

OTHER REFERENCES

The Review of Scientific Instruments, vol. 32, No. 6, June 1961, pp. 757, 758 (Bossert).

RUDOLPH V. ROLINEC, *Primary Examiner.*

M. J. LYNCH, *Assistant Examiner.*